3,415,832
PROCESS FOR THE MANUFACTURE OF POLY-
CHLORO-4-PYRIDYL SULFONES
Charles D. Crawford, Walnut Creek, Calif., assignor to
The Dow Chemical Company, Midland, Mich., a corporation of Delaware
No Drawing. Filed June 23, 1966, Ser. No. 559,748
6 Claims. (Cl. 260—294.8)

ABSTRACT OF THE DISCLOSURE

A method for the manufacture of 2,3,5-trichloro-4-(loweralkyl) sulfones and 2,3,5,6-tetrachloro-4-(loweralkyl) sulfones which involves contacting an aqueous slurry of 2,3,5-trichloro-4-(loweralkyl)-sulfoxides or 2,3,5,6-tetrachloro-4-(loweralkyl)-sulfoxides with chorine gas at a temperature less that the softening point of the solid phase. The sulfones of this invention are useful as pesticides for the control of various bacterial and fungal pests.

---

The present invention relates to a new and improved method for the manufacture of 2,3,5-trichloro-4-pyridyl alkyl sulfones and 2,3,5,6-tetrachloro-4-pyridyl alkyl sulfones. These compounds are characterized by the following formula:

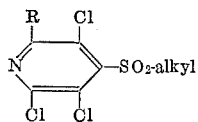

In this and succeeding formulae, R represents chlorine or hydrogen. The term "alkyl" is employed in the present specification and claims to refer to a branched or straight chain alkyl radical containing 1, 2, 3, 4, 5, or 6 carbon atoms, such as methyl, ethyl, isopropyl, sec. butyl, isobutyl, butyl, amyl, 2-ethyl butyl and 1,1-dimethyl propyl. The 2,3,5-trichloro- and 2,3,5,6-tetrachloro-4-pyridyl alkyl sulfones are crystalline solid materials which are of very low solubility in water and of moderate solubility in common organic solvents. They are useful as pesticides for the control of various organisms and particularly for the control of many bacterial and fungal pests such as *Venturia inaequalis*, *Staphylococcus aureus*, *Candida albicans*, *Verticillium albo-atrum*, *Piricularia oryzae*, *Phythium spp.*, *Rhizoctonia solani*, *Fusarium solani*, *Salmonella pullorum*, *Trichophyton mentagrophytes*, *Erwinia amylovora*, *Bacillus cereus*, *Cerospora beticola*, *Penicillium digitatum*, *Streptomyces scabies* and *Thielaviopsis basicola*. They have been found to be particularly useful for application to plants and plant parts for fungal control and to mitigate the attack of the organisms of mold and mildew. They have also been found to be of outstanding value as constituents in plaster, ink, wallboard, textiles, wood, paper, adhesives, soaps, detergents, cutting oils, polymeric materials, and oil and latex paints to prevent the attack of various fungal pests and the subsequent economic loss due to the degradation of such products by micro-organisms.

The compounds can be prepared by known methods of sulfide oxidation from the corresponding 2,3,5-trichloro-4-(lower-alkylthio)pyridines and 2,3,5,6-tetrachloro-4-(lower-alkylthio)pyridines. The oxidation is accomplished in these methods by employing an oxidizing agent such as nitric acid, hydrogen peroxide, potassium permanganate or chromate, and chromate-sulfuric acid (mixture of alkali metal chromate and sulfuric acid). The oxidation of one molecule of sulfide to the corresponding sulfone requires two atoms of oxygen. Usually the oxidizing agent is employed in molar proportions which will provide oxygen in stoichiometric amounts. These oxidative procedures have usually been characterized as giving relatively low yields of the sulfonylpyridines. Further, the products of such processes have not been free of undesired reaction products such as the intermediate 2,3,5-trichloro- and 2,3,5,6-tetrachloro-4-pyridyl sulfoxides and polychloropyridyl sulfonic acids. These products are particularly encountered in procedures employing nitric acid and hydrogen peroxide as oxidizing reagents.

The sulfoxides are not so lacking in biocidal activity as to render ineffective the sulfones when mixed therewith and polychloropyridyl sulfone products comprising as much as 15 mole percent of the corresponding sulfoxides are valuable in the above enumerated uses. However, it is generally highly preferred that the pyridyl sulfone products be essentially free of the sulfoxides. It has been found quite difficult to separate out the sulfoxide content of the mixed products obtained with known methods of sulfide oxidation. Accordingly, it is believed evident that an improved method for the manufacture of the 2,3,5-trichloro and 2,3,5,6-tetrachloro-4-(lower-alkylsulfonyl)pyridines is desirable in order to provide for adequate commercial qauntities of the products in the market place.

It is an object of the present invention to provide a new and improved method for the production of 2,3,5-trichloro and 2,3,5,6-tetrachloro-4-pyridyl alkyl sulfones. It is a further object to provide a method which is more economical than known methods and gives yields of the sulfonylpyridines in excess of those previously obtained. A particularly important object is the provision of a method which gives the desired sulfonylpyridines containing no substantial amounts of sulfinylpyridines. Other objects will become apparent from the following specification and claims.

The new process comprises contacting with chlorine a pyridyl sulfoxide having the formula

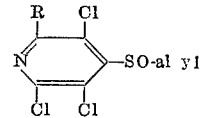

as a suspension of solid particles in water at a temperature below their softening point, "R" and "alkyl" being defined as above and the solid particles having an effective diameter of less than 1 millimeter. During the reaction, the sulfoxide is progressively converted in place to a crystalline solid sulfone. Following the reaction, the desired product can be separated in substantially quantitive yields by decantation or filtration.

To avoid side reactions, such as chlorinolysis of the alkylsulfinyl group or chlorination of the alkyl group it is critical and essential that the sulfoxide reactant be not present in a liquid or even semi-liquid phase. Accordingly, the temperature must be maintained below the softening point of the solid phase (which changes in composition throughout the reaction) so long as chlorine is being introduced. Also, no appreciable amount of solvent for the sulfoxide can be present.

To obtain the desirable sulfoxide conversions in accordance with the present invention, it is critical and essential that at least the final effective diameter of the particles containing the sulfoxide be less than one millimeter. Although the oxidation can proceed at the surface of larger particles, the chlorine and water (or HOCl) cannot penetrate into such particles well enough to afford high conversions.

To obtain maximum conversions at practicable rates, it is essential that the effective particle diameter be less than 50 microns, for the above reasons. It is also essential that the aqueous phase comprise not over 20 percent by weight of hydrogen chloride, for reasons which will be evident from the following considerations.

The oxidation is considered to involve the reactions:

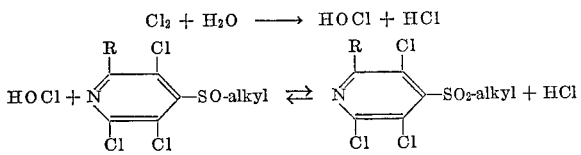

$$Cl_2 + H_2O \longrightarrow HOCl + HCl$$

The second reaction apparently proceeds to an equilibrium which is shifted to the right as the temperature is increased and which determines the maximum degree of sulfoxide conversion attainable at a given concentration of hydrochloric acid. It will be seen that since two moles of hydrogen chloride are formed for each mole of sulfoxide converted, the acid concentration increases rapidly as the reaction progresses. Thus, it is necessary either to in some manner assure that the final acid concentration does not exceed a certain level or to raise the temperature in order to achieve maximum sulfoxide conversions. The maximum temperature is limited by the necessity for keeping the organic phase solid, so that the maximum permissible acid concentration is dependent in turn on the melting points and relative amounts of the particular compounds present in the solid phase. Preferably, the process is practiced at atmospheric pressure and the acid concentration is kept below about 12 percent by weight HCl. Concentrations up to about 16% by weight HCl can be tolerated when the solid phase has a softening point at least as high as about 100°. Final acid concentrations as high as 20 weight percent HCl can be tolerated when the solid phase consists of the highest melting sulfoxides and sulfones. However, superatmospheric pressures are required to practice the process at the temperatures required for good conversion at acid levels appreciably above about 16% and a less preferred mode of operation results.

The polychloropyridyl alkyl sulfoxides can be prepared by any appropriate method but are most conveniently prepared from the corresponding sulfides in a manner essentially identical to that described above for oxidation of the sulfoxides to the sulfones. In a particularly satisfactory procedure, a straight through conversion of the sulfide to the sulfone is carried out.

The reaction conditions are less critical for the first step of the oxidation—i.e. for sulfoxide formation—than for the further oxidation to the sulfone. Thus, the final particle diameter during the first step does not have to be less than 1 millimeter, although a maximum degree of subdivision is desirable. Ordinarily the sulfide is charged to the straight through reaction as particles less than 1 millimeter in effective diameter and preferably as particles less than 50 microns in effective diameter.

The extent of oxidation of the sulfide to sulfoxide is much less dependent on acid concentration and it is ordinarily not necessary to limit the acid concentration or raise the temperature to complete this step. Thus, chlorination and/or chlorinolysis is less of a problem and an inert solvent for the sulfide can be employed unless "straight through" operation is to be practiced. In the latter case, a solvent is not used and the temperature is maintained below the softening point of the solid phase. In a particularly preferred method of preparing the sulfide particles, the sulfide is dissolved in a solvent and reprecipitated by combining the solution with a miscible non-solvent. It has been found that when the reprecipitation is effected by adding a methanol solution of the sulfide to water, a very finely divided but readily washed and separated solid is obtained.

The practice of the invention is set forth in greater detail as follows.

The sulfoxide or sulfide is charged to a suitable glass lined or other acid resistant reactor is a slurry in water of finely divided particles. The slurry is maintained with stirring at a temperature below the softening point of the solid phase and contacted with chlorine gas, either by sparging or by stirring the slurry under a chlorine atmosphere in a closed system. When oxidizing sulfide, or in the initial stages of oxidizing sulfoxide, the temperature is maintained ordinarily at about 25° to 45°. In the latter stage of sulfone preparation, the temperature is raised almost to the softening point of the solid phase, the latter being generally about the same as the melting point of the lowest melting organic species present. In straight through operation starting with a sulfide, the chlorine is passed in at a reaction temperature of about 25°–35° until an equilibrium conversion to sulfone has been approximated, i.e. for a period of about 3 to 12 hours. The temperature is then raised above 50° (usually to about 90°) and chlorine passed through for an additional ½ to 24 hours.

The reaction is terminated by stopping the chlorine. The reaction mixture is filtered or centrifuged, before or after cooling, to separate the solid product.

For maximum utilization of reactor volume, it is desirable to operate at as high a content of reactant solids in the slurry as possible. However, this is ordinarily held below about 20% by weight in order to ensure that the HCl formed will be diluted with enough water to keep the final acid concentration below 12–16%. The amount of HCl which will be formed is dependent on the percent oxidizable solids in the slurry. Only two moles of water per mole of sulfide charged are required for sulfone formation but generally at least 6 pounds of water per pound of sulfide is used to ensure fluidity and acid dilution.

An excess of chlorine over the stoichiometric requirements of the oxidation reactions is not essential but is generally employed. Conveniently, sufficient chlorine may be sparged in to provide, through bubbling action, the desired agitation or stirring of the reaction mixture. When the oxidation is carried out by stirring the suspension under a chlorine atmosphere, a higher effective chlorine concentration in the aqueous phase can be obtained by introducing the chlorine under superatmospheric pressure.

The following examples merely illustrate the present invention and are not to be construed as limiting.

Example I

Ninety-four (94) pounds of 2,3,5,6-tetrachloro-4-(methylthio)pyridine (melting at 45° C.) was dissolved at 65° C. in 86 gallons of methanol. The solution was added slowly with rapid stirring to 50 gallons of ice water to precipitate the sulfide as crystalline solid particles less than 50 microns in effective diameter. The finely divided thiopyridine product was separated by filtration, washed with water and suspended with stirring in sixty (60) gallons of water at 25° C. Stirring was thereafter continued and sixty (60) pounds of gaseous chlorine bubbled into and contacted with the reaction mixture. The contacting was carried out in a period of 6 hours and at a temperature of 25° C. The temperature of the suspension and reaction mixture was then slowly raised to 95° C. and an additional two hundred and fifty (250) pounds of chlorine bubbled into and contacted with the reaction mixture at this temperature over a period of 24 hours. Upon completion of the reaction, the reaction mixture was filtered to separate ninety-three (93) pounds of the dried sulfonylpyridine product melting at 138°–148° C. Analysis of the product established it as 2,3,5,6-tetrachloro-4-(methylthio)pyridine containing less than 1% of 2,3,5,6-tetrachloro-4-(methylsulfinyl)pyridine.

Example II 5.43 pounds of crude 2,3,5,6-tetrachloro-4-(propylthio)pyridine comprising 1.87 pounds of inert impurities was reprecipitated as particles of less than 50 microns effective diameter. The sulfide particles were suspended in 125 lbs. of water and sparged at 25° C. with a total of 10 lbs. of chlorine in 5 hours. The temperature was then raised to 80 degrees and 120 pounds more of chlorine sparged through the suspension in 24 hours. The reaction mixture was cooled and filtered. The filtrand was weighed and analyzed and found to account for all of the sulfide starting material as sulfoxide (0.4% conversion of the sulfide) and sulfone (99.6% conversion of the sulfide to 2,3,5,6-tetrachloro-4-(propylsulfonyl)pyridine).

Example III

Five (5) pounds of 2,3,5-trichloro-4-(ethylsulfinyl) pyridine is suspended as particles less than 1 millimeter in effective diameter with stirring in three (3) gallons of water at 30° C. Stirring is thereafter continued and fifteen pounds of gaseous chlorine bubbled into and contacted with the reaction mixture. The contacting is carried out over a period of 6 hours at a temperature of 25° C. The temperature of the suspension and reaction mixture is then slowly raised to 90° C. and an additional fifteen (15) pounds of chlorine bubbled into and contacted with the reaction mixture at this temperature. During the contacting operation, the particles of 2,3,5-trichloro-4-(ethylsulfinyl)pyridine product progressively are converted in the reaction mixture to crystalline solid particles of 2,3,5-trichloro-4-(ethylsulfonyl)pyridine. Upon completion of the reaction, the reaction mixture is filtered to separate the pyridyl sulfone product in a yield of 95% based upon the employed pyridyl sulfoxide starting material.

In similar operations these same outstanding results are obtained when oxidizing such thiopyridines and sulfinylpyridines as 2,3,5-trichloro-4-(methylthio)pyridine; 2,3,5-trichloro-4-(methylsulfinyl)pyridine (melting at 91° C.); 2,3,5,6-tetrachloro-4-(ethylthio)pyridine; 2,3,5,6-tetrachloro-4-(ethylsulfinyl)pyridine (melting at 113° C.); 2,3,5,6-tetrachloro-4-(propylsulfinyl)pyridine; 2,3,5,6-tetrachloro-4-(isopropylsulfinyl)pyridine; 2,3,5-trichloro-4-(ethylthio)pyridine; 2,3,5-trichloro-4-(ethylsulfinyl)pyridine; 2,3,5-trichloro-4-(butylthio)pyridine; 2,3,5-trichloro-4-(butylsulfinyl)pyridine; 2,3,5,6-tetrachloro-4-(isobutylthio)pyridine; 2,3,5,6-tetrachloro-4-(isobutylsulfinyl) pyridine; 2,3,5 - trichloro - 4 - (neopentylthio)pyridine, and 2,3,5,6-tetrachloro-4-(hexylsulfinyl)pyridine. In such operations the corresponding sulfonylpyridines are obtained such as 2,3,5-trichloro-4-(methylsulfonyl)pyridine (melting at 103° C.), 2,3,5-trichloro-4-(ethylsulfonyl)pyridine (melting at 87° C.), 2,3,5,6-tetrachloro-4-(ethylsulfonyl)pyridine (melting at 129–131° C.), 2,3,5,6-tetrachloro-4-(propylsulfonyl)pyridine; 2,3,5,6-tetrachloro-4-(isopropylsulfonyl)pyridine; 2,3,5-trichloro - 4-(butylsulfonyl)pyridine (melting at 78.5° C.); 2,3,5,6-tetrachloro-4-(isobutylsulfonyl)pyridine (melting at 119° C.); 2,3,5-trichloro-4-(neopentylsulfonyl)pyridine and 2,3,5,6-tetrachloro-4-(hexylsulfonyl)pyridine.

What is claimed is:

1. The method for the manufacture of a sulfone having the formula

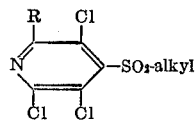

which comprises contacting with chlorine gas a sulfoxide having the formula

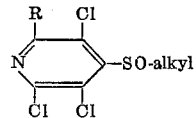

as a suspension in water of solid particles less than 1 millimeter in effective diameter, wherein R is hydrogen or chlorine and alkyl is a straight or branched chain alkyl radical containing from 1 to 6 carbons inclusively and the contacting is carried out at a temperature less than the softening point of the solid phase.

2. The method of claim 1 comprising the additional step of forming the sulfoxide by contacting with chlorine gas and water a sulfide having the formula

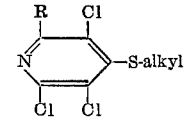

3. The method of claim 2 wherein the sulfide is contacted with chlorine gas as a suspension in water of solid particles less than 1 millimeter in effective diameter at a temperature below the softening point of the solid phase.

4. The method of claim 1 wherein the aqueous phase comprises less than 16 percent by weight of hydrogen chloride and the particles are less than 50 microns in effective diameter.

5. The method of claim 3 wherein the sulfide is contacted with chlorine gas at a temperature below 45° for a period of from 3 to 12 hours and then at a temperature above 50° for a period of from ½ to 24 hours, thereby effecting at least a 95 percent conversion of sulfide to sulfone.

6. The method of claim 2 comprising the additional step of forming the sulfide particles by reprecipitation from a solution of the sulfide.

References Cited

Dronov et al.: Chem. Abstracts, vol. 63, Par. 4235, (1965).

HENRY R. JILES, *Primary Examiner.*

A. L. ROTMAN, *Assistant Examiner.*

U.S. Cl. X.R.

167—33